United States Patent
Thimmel et al.

(10) Patent No.: US 8,694,557 B2
(45) Date of Patent: Apr. 8, 2014

(54) EXTENSIBILITY OF METAOBJECTS

(75) Inventors: Bernhard Thimmel, Edingen-Neckarhausen (DE); Adam Polly, Stutensee-Blankenloch (DE); Uwe Schlarb, Ostringen (DE); Stefan A. Baeuerle, Rauenberg (DE)

(73) Assignee: SAP AG, Walldorf (DE)

(*) Notice: Subject to any disclaimer, the term of this patent is extended or adjusted under 35 U.S.C. 154(b) by 50 days.

(21) Appl. No.: 12/829,617

(22) Filed: Jul. 2, 2010

(65) Prior Publication Data

US 2012/0005179 A1 Jan. 5, 2012

(51) Int. Cl.
*G06F 7/00* (2006.01)
*G06F 17/30* (2006.01)

(52) U.S. Cl.
USPC .......................................... 707/803; 707/809

(58) Field of Classification Search
USPC .................................... 707/803, 809
See application file for complete search history.

(56) References Cited

U.S. PATENT DOCUMENTS

| | | | |
|---|---|---|---|
| 5,918,232 A | 6/1999 | Pouschine et al. | |
| 6,182,060 B1 | 1/2001 | Hedgcock et al. | |
| 6,434,544 B1 | 8/2002 | Bakalash et al. | |
| 7,222,130 B1 | 5/2007 | Cras et al. | |
| 2003/0093755 A1* | 5/2003 | O'Carroll | 715/500 |
| 2005/0172261 A1 | 8/2005 | Yuknewicz et al. | |
| 2006/0101091 A1* | 5/2006 | Carbajales et al. | 707/202 |
| 2009/0063500 A1* | 3/2009 | Zhai et al. | 707/10 |
| 2009/0271158 A1 | 10/2009 | Yeh et al. | |
| 2010/0161648 A1* | 6/2010 | Eberlein et al. | 707/769 |
| 2012/0030256 A1 | 2/2012 | Pfeifer et al. | |

FOREIGN PATENT DOCUMENTS

EP  1 494 131 A1  6/2003
WO  2005/098593 A2  10/2005

OTHER PUBLICATIONS

Willis, G. "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).

Taylor, M. et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

Joseph W. Yoder et al., "Architecture and Design of Adaptive Object-Models", ACM Sigplan Notices, XP-002249967, vol. 36, No. 12, Dec. 2001, pp. 50-60 (total 11 pages).

"European Search Report", dated Oct. 13, 2009, for European Application No. 09011280.6, 2pgs.

(Continued)

*Primary Examiner* — Cam Truong
(74) *Attorney, Agent, or Firm* — Buckley, Maschoff & Talwalkar LLC

(57) ABSTRACT

A system may include acquisition of metadata defining a first object model including extensible entities, the first object model comprising an instance of a metaobject, acquisition of metadata defining an extension object model, the extension object model to extend at least one of the extensible entities of the first object model, and merging of the object model and the extension object to create metadata defining an extended object model, the extended object model comprising an instance of the metaobject.

6 Claims, 10 Drawing Sheets

(56) References Cited

OTHER PUBLICATIONS

"European Search Report of the European Patent Office", mailed Oct. 26, 2009, for EP 09011216.0-1243, 1pg.
Stefan A. Bauerle et al., U.S. Appl. No. 12/198,315, entitled "Dynamic Extension Fields for Business Objects", filed Aug. 26, 2008.
Stefan A. Bauerle et al., U.S. Appl. No. 12/198,351, entitled "Dynamic Node Extension Fields for Business Objects", filed Aug. 26, 2008.
Stefan A. Bauerle et al., U.S. Appl. No. 12/198,392, entitled "Functional Extensions for Business Objects", filed Aug. 26, 2008.
Gerd M. Ritter et al., U.S. Appl. No. 12/339,328, entitled "UI-Driven Binding of Extension Fields to Business Objects", filed Dec. 19, 2008.
Peter Eberlein et al., U.S. Appl. No. 12/339,392, entitled "Flexible Multi-Tenant Support of Metadata Extension", filed Dec. 19, 2008.
"Non-Final Office Action", mailed Aug. 20, 2012, for U.S. Appl. No. 12/981,844, entitled "Field Extensibility for Analytical Reports", filed Dec. 30, 2010, 12pgs.

\* cited by examiner

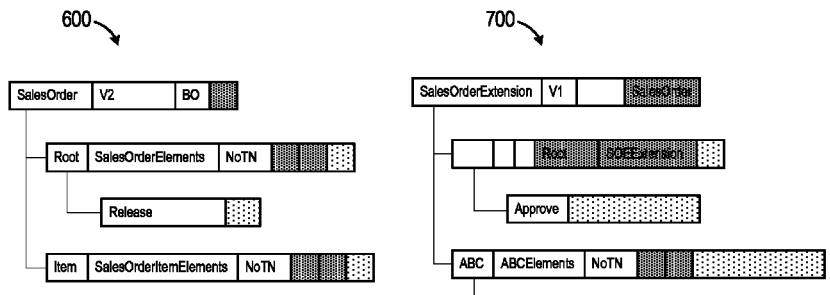
FIG. 6
FIG. 7
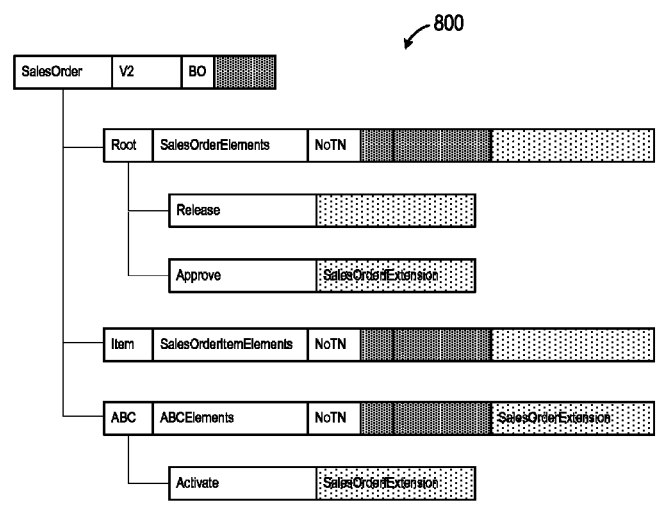
FIG. 8

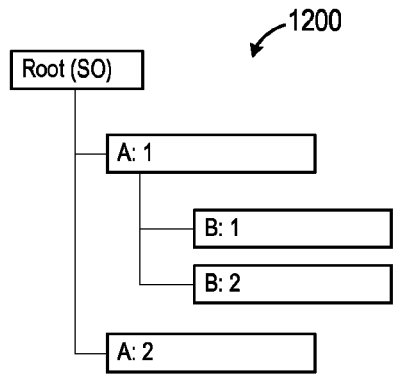
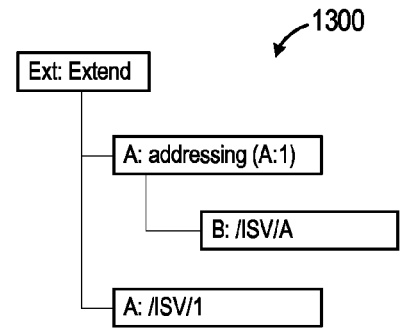
FIG. 12
FIG. 13
| | 1410 |
|---|---|
| BO | A |
| SO | 1 |
| SO | 2 |
| | |
| | |
| | 1410 |
|---|---|
| BO | A |
| SO | 1 |
| SO | 2 |
| /ISV/EXT | 1 |
| /ISV/EXT | /ISV/1 |
| | | 1420 |
|---|---|---|
| BO | A | B |
| SO | 1 | 1 |
| SO | 1 | 2 |
| | | |
| | | |
| | | 1420 |
|---|---|---|
| BO | A | B |
| SO | 1 | 1 |
| SO | 1 | 2 |
| /ISV/EXT | 1 | /ISV/A |
| | | |
FIG. 14A
FIG. 14B

EXTENSIBILITY OF METAOBJECTS

FIELD

Some embodiments relate to metaobjects supported by a business process platform. More specifically, some embodiments relate to the extension of metaobject instances within a business process platform.

BACKGROUND

An application platform may implement metaobjects to support different business solutions. Metaobjects may include generic models of a business object, a BI view, a floorplan (i.e., a user interface layout), user interface text, a process component, and a message type, among others. A business object, for example, is a software model representing real-world items used during the transaction of business. An instance of a business object metaobject may comprise a SalesOrder object model or an Organization object model. Instances of these object models, in turn, represent specific data (e.g., SalesOrder SO435539, ACME corporation).

An instance of a business object metaobject may specify business logic and/or data having any suitable structure. The structure may be determined based on the requirements of a business scenario in which the instance is to be deployed. A business application for a particular business scenario may require many business object instances, where the structure of each has been determined based on the requirements of the particular business scenario.

A customer deploying a business solution may desire changes to the business object metaobject instances (and/or to the instances of other metaobjects) included in the business solution. For example, a customer may require a field (e.g., SerialNumber) which does not exist within the Product business object instance of a business solution. In addition, another customer may require an additional node or query within the Product business object instance of the same business solution.

Conventional techniques for adding a field to an existing business object instance include APPEND mechanisms which change the definition of the business object instance at the data dictionary level. This technique requires advanced technical skill and presents other drawbacks as well. For example, an entire database system must be recompiled to effect such a changed definition, and the change occurs globally with respect to all instantiations of the business object within the system. Moreover, the change may require reprogramming of application clients which interact with the changed business object.

Commonly-assigned co-pending U.S. patent application Ser. No. 12/339,328, entitled "UI-Driven Binding Of Extension Fields To Business Objects", describes systems for facilitating the addition of extension fields to business objects instances. However, these systems do not provide for the addition of entities other than extension fields.

Systems are desired for facilitating the addition of nodes, actions, fields, queries, etc. to object models used in business application platforms. These additions may provide increased flexibility to customers. It is desirable that such additions occur at a model level in order to maintain system coherence and modularity.

BRIEF DESCRIPTION OF THE DRAWINGS

FIG. 6 is a diagram of a core SalesOrder object model according to some embodiments.

FIG. 7 is a diagram of a SalesOrder object model extension according to some embodiments.

FIG. 8 is a diagram of an extended SalesOrder object model according to some embodiments.

FIG. 12 is a diagram of a simplified instance of a business object metaobject according to some embodiments.

FIG. 13 is a diagram of an extension instance of a business object metaobject according to some embodiments.

FIGS. 14A and 14B are tabular representations of metadata within a metadata repository according to some embodiments.

DETAILED DESCRIPTION

Figure 1:
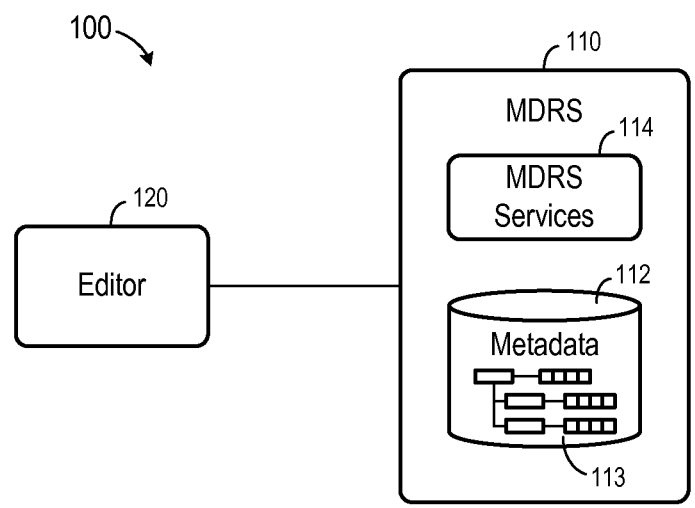
FIG. 1 is a block diagram of a system according to some embodiments.

FIG. 1 is a block diagram of system 100 according to some embodiments. FIG. 1 represents a logical architecture for describing some embodiments, and actual implementations may include more or different components arranged in any manner. System 100 may be implemented using any number of computer devices, and one or more processors may execute program code to perform processes described herein. Meta-metaobjects, metaobjects, object models and object model instances may be embodied in any types of electronic data structures.

System 100 includes metadata repository (MDRS) 110, which in turn includes metadata 112 and MDRS services 114. MDRS 110 may be implemented in an application platform based on SAP Netweaver®, but is not limited thereto. Metadata 112 includes metadata of various metadata models 113. These metadata models 113 include metaobjects and instances of the metaobjects, referred to herein as object models or objects. The metaobjects and object models are defined by metadata of metadata 112.

As mentioned above, the metaobjects may include generic models of a BI view, a floorplan, a business object, a user interface text, a process component, and a message type, but embodiments are not limited thereto. The metaobjects and object models may be embodied in any type of data structure, including but not limited to eXtensible Markup Language files. As in the conventional storage of object instance data, the metadata defining the specific metaobjects and object models may be stored in database tables and/or any other suitable format.

Each metaobject of metadata models 113 may comprise an instance of a same meta-metadata model (or meta-metaobject). The meta-metaobject may consist of nodes, composite associations, associations, elements structure and attribute properties. Development of specific business object metaobjects, specific floorplan metaobjects, etc. may therefore proceed using the same development technologies. Moreover, access and lifecycle issues of the various specific metaobjects may be managed using similar (or identical) mechanisms.

Editor 120 may comprise any system to edit metadata 112. Editor 112 may comprise a software application which uses MDRS services 114 to access, change, and add to metadata 112. For example, editor 112 may be used to define an extension object model to extend at least one extensible entity of an associated object model.

Figure 2:
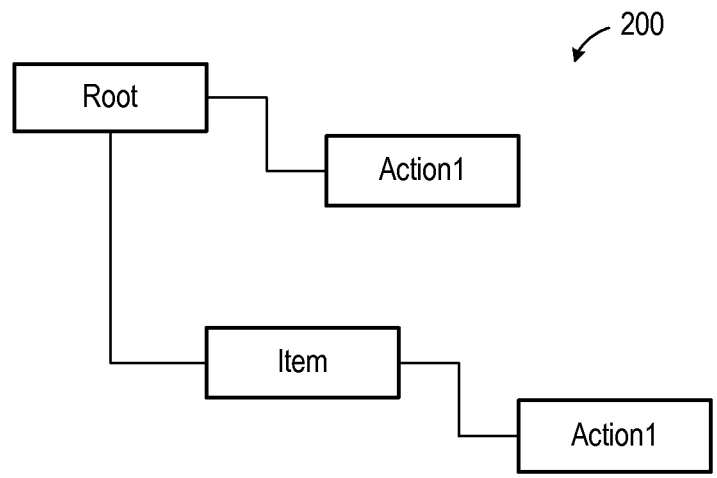
FIG. 2 is a diagram of a simplified instance of a business object metaobject according to some embodiments.

For example, FIG. 2 is a diagram of object model 200, which is a simplified instance of a business object metaobject. Object model 200 includes two nodes, their data types, and two actions. Object model 200 may, for example, represent a SalesOrder object model which is delivered by an application platform provider (e.g., SAP AG®) as part of a software package. Such an object model may be referred to as a "core" object model.

Figure 3:
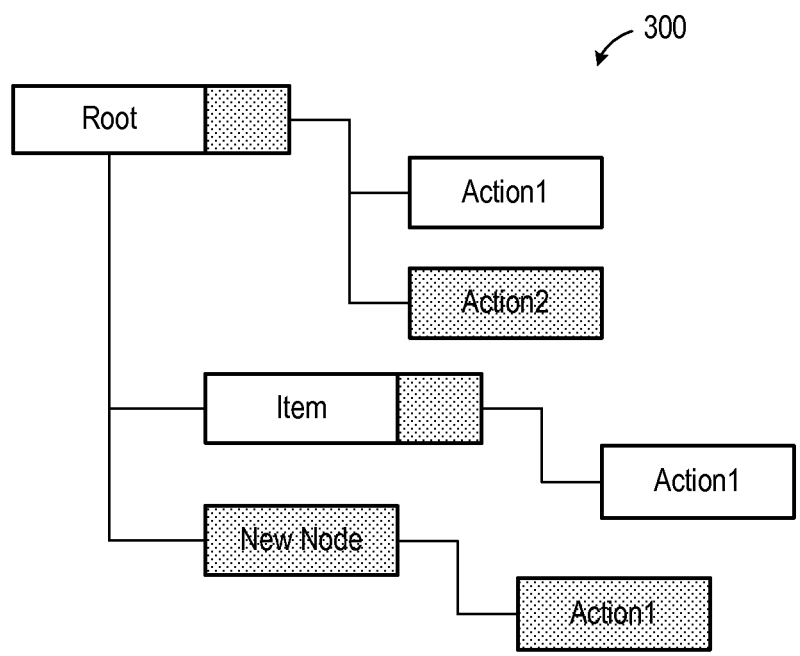
FIG. 3 is a diagram of an extended instance of a business object metaobject according to some embodiments.

FIG. 3 is a diagram of object model 300, which represents a version of object model 200 including additional fields, nodes, and actions. Object model 300 is also an instance of the business object metaobject. The extensions of object model 300 may have been created by an industry solution vendor (ISV), a customer, or another entity. Such an object model may be referred to as an "extended" object model.

For system integrity, object model 300 should behave in the same way as if object model 200 had originally included the additional entities. Accordingly, some embodiments prohibit the addition of functionality or structures that could not have been included in object model 200. The reverse does not necessarily hold true, in that certain functionality or structures can be added in the original object model and not in the extended object model.

According to some embodiments, an extension object model is used to generate an extended object model based on an original object model. The extension object model can only add instances of structural elements or extensions of existing structural elements as defined by the metaobject of which the object model is an instance. Embodiments may therefore provide a metaobject (e.g., a business object metaobject) that provides the ability to define such restrictions.

As will be described below, a service consumer accessing an instance of the original object model (e.g., object model 200) will be presented with an instance of the extended object model (e.g., object model 300). If multiple extension object models corresponding to the original object model are active, all such extensions object models are merged into the original object model to create an extended object model. Such a situation can occur, for example, in a customer system that includes two ISV solutions extending the same core object model. The customer may further extend the core object model in the same manner.

Accordingly, additivity should be considered when determining which elements can be added to an object model and how these elements are added. For example, added elements should not redefine properties of the original object model like name, type or the Enterprise Service Infrastructure properties of existing entities. While actions may be added without any restrictions in some embodiments, an arbitrary addition of preconditions to a status schema could lead to deadlocks between independent extensions.

In some embodiments, an extension object model contains only the elements which it adds to a corresponding original object model (i.e., the isolated delta). Advantageously, delta isolation is redundancy free and, due to delta isolation, changes to the original do not automatically invalidate the delta isolation and multiple extensions can be merged at runtime which were not aware of each other at design time.

An extension object model including an isolated delta may have its own modeling, review and activation life cycle. An extension object model may therefore be accessed and modified using a modeling tool such as editor 120. As will be described below, an extension object model and its corresponding object model (e.g., core object model) may each comprise instances of the same metaobject. Accordingly, the metaobject (e.g., business object metaobject) may include elements to define the extensibility of its instances.

Figure 4:
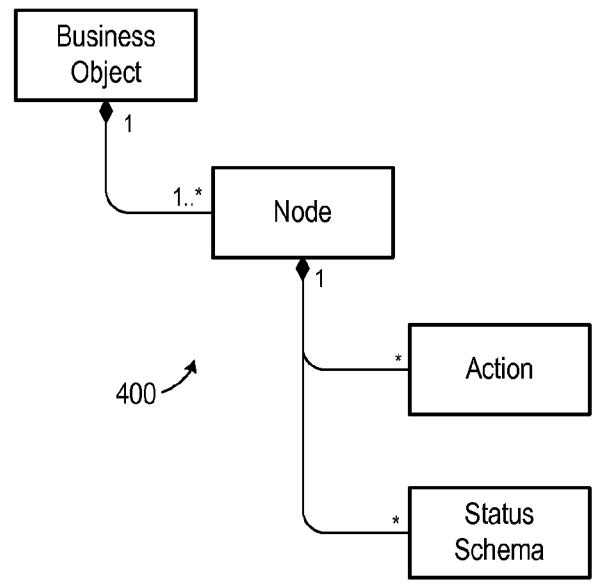
FIG. 4 is a diagram of a business object metaobject according to some embodiments.

FIG. 4 is a diagram of a simplified model of a business object metaobject according to some embodiments. Metaobject 400 consists of nodes that in turn consist of actions and status schemas. In order to provide for extensibility of instances of metaobject 400 according to some embodiments, the designer of metaobject 400 has to specify which of its entities can be extended or added via extensions. For example, the designer could specify that new actions can be added to existing nodes, but that no new status schemas can be added to existing nodes. The designer could also specify that new nodes can be added including all sub-information (i.e., actions and status schemas).

These constraints may be specified by including an attribute or flag in the parent meta-metaobject (i.e., of which metaobject 400 is an instance) that specifies if an entity can be added via an extension. In the above example, this flag would be set for Node and for Action. If this flag is set for a node in a metaobject, this entity, including all sub-entities, can be added by an extension object to an existing parent entity.

Figure 5:
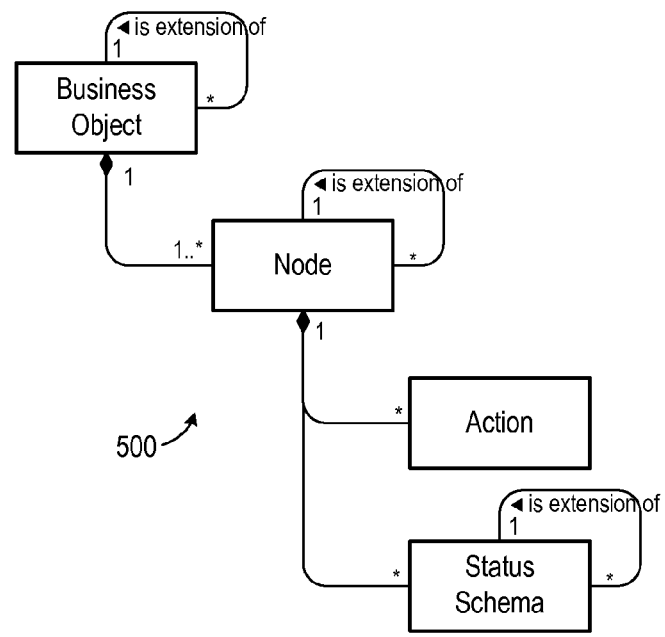
FIG. 5 is a diagram of an extensible business object metaobject according to some embodiments.

FIG. 5 is a diagram of metaobject 500 according to some embodiments. Metaobject 500 is defined such that its instances may include a core object model as well as an extension object model of the core object model.

In the example of FIG. 5, all entities apart from Action can be extended, although new Actions can be added. Certain constraints of metaobject 500 according to some embodiments have not been made explicit. For example, metaobject 500 does not clearly show that an original object model cannot contain any node extensions or that only node extensions can carry schema extensions. Furthermore, a node that uses the 'IsExtensionOf' association must inherit most properties from the node that it extends.

The node structure of metaobject 500 is almost completely defined by original metaobject 400. Some embodiments of metaobject 500, which permit a 'CanBeEnhanced' flag in addition to a 'CanBeAddedViaExtension' flag, may include additional nodes.

Instantiations of the elements of metaobject 500, which make up an instance of metaobject 500 (e.g., a SalesOrder object model or a Sales Order Extension object model) may hold metadata defining the non-extended (i.e., original) object model, metadata defining the extension delta of the extension object model, and metadata used to merge the extension delta with non-extended object model.

FIGS. 6 through 8 illustrate the above-described elements within non-extended object model 600, extension object model 700, and extended object model 800 according to some embodiments. The white fields are elements used to define non-extended object model 600, the darker-shaded fields are elements used to define extension object model 700 and the lighter-shaded fields are elements resulting from the merge of both in non-extended object model 600. To avoid clashes of added actions, nodes, etc., some embodiments require a namespace for every sub-entity name.

Non-extended object model 600 is a SalesOrder object model which models two nodes and one action. Only the white fields are needed to define these entities. The two top nodes of extension object model 700 use the darker-shaded fields to signify that they do not define the SalesOrder object model or the root node, but that they are both mainly references to corresponding nodes in object model 600. The other white nodes contain the actual delta information, and the information in the lighter-shaded fields is not strictly necessary. The information in the lighter-shaded fields of extended object model 800 is used to indicate which entities come from which extension.

Even if the addition of new nodes to an object model and of new actions to a node is generally allowed, it may be desired to prevent such additions to a particular object model or object model node. In Status and Action Management extensibility, a similar situation arises in that a particular action in a status schema should not be influenced by extension preconditions. A 'Fixed Precondition Flag' is therefore associated with actions.

Analogous to this flag, the metaobject parent of an extensible object model may be redefined to include a 'CannotBeExtended' indicator. This attribute indicates that an entity cannot be added via an extension. The indicator is then set by a designer of the extensible object model. Consequently, the designer would be able to express, for example, that the SalesOrderProductItem cannot be extended with actions or that the ActivationStatusCode cannot be extended with new values.

Figure 9:
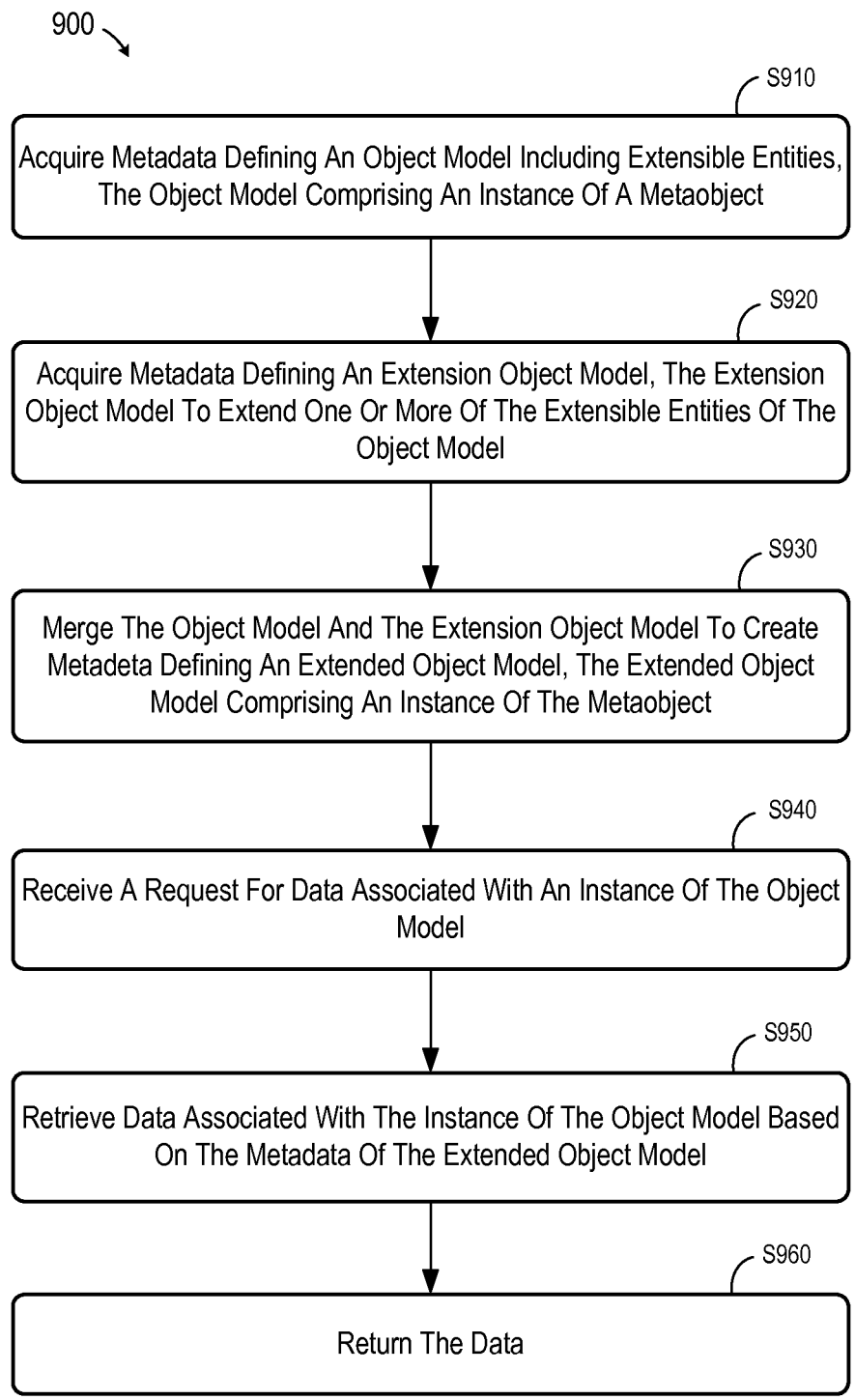
FIG. 9 is a flow diagram of a process according to some embodiments.

FIG. 9 is a flow diagram of process 900 according to some embodiments. Process 900 may be performed by a system providing extensible object models according to some embodiments. For example, a processor may execute program code to cause performance of process 900.

Initially, at S910, metadata defining an object model is acquired. The defined object model includes extensible entities, and the object model is an instance of a metaobject. With reference to some examples of the above discussion, the object model may be a metadata model 113 defined in metadata 112. The object model may comprise an instance (e.g., a SalesOrder object model) of a Business Object metaobject. The Business Object metaobject may, in turn include elements which allow instances thereof to define extensible entities. Accordingly, the acquired metadata of the object model may define extensible entities of the object model.

Next, at S920, metadata defining an extension object model is acquired. The extension object model is to extend at least one of the extensible entities of the object model of S910. The extension object model may also be a metadata model 113 defined in metadata 112. In some embodiments, the extension object model is an instance of the same Business Object metaobject of which the object model is an instance. Embodiments are not, however, limited thereto.

The metadata of the extension object model may extend at least one of the extensible entities of the object model. In some embodiments, the metadata defines an extension delta of the object model as described above. FIG. 7 illustrates one example of metadata that may be acquired in some embodiments of S920.

The object model and the extension object model are merged at S930. The merge creates metadata defining an extended object model such as that shown in FIG. 8. Advantageously, the extended object is an instance of the same metaobject of which the object model is an instance.

According to some embodiments, MDRS 110 performs S910 through S930 at design time. For example, a designer may operate editor 120 to select a particular object model at S910. The designer may then create metadata of an extension object model associated with the selected object model at S920. The merge may then occur at S930 in response to a command to activate the extension object model. After the merge, editor 120 may be operated to design user interfaces or other entities to consume instances of the extended object model.

Figure 10:
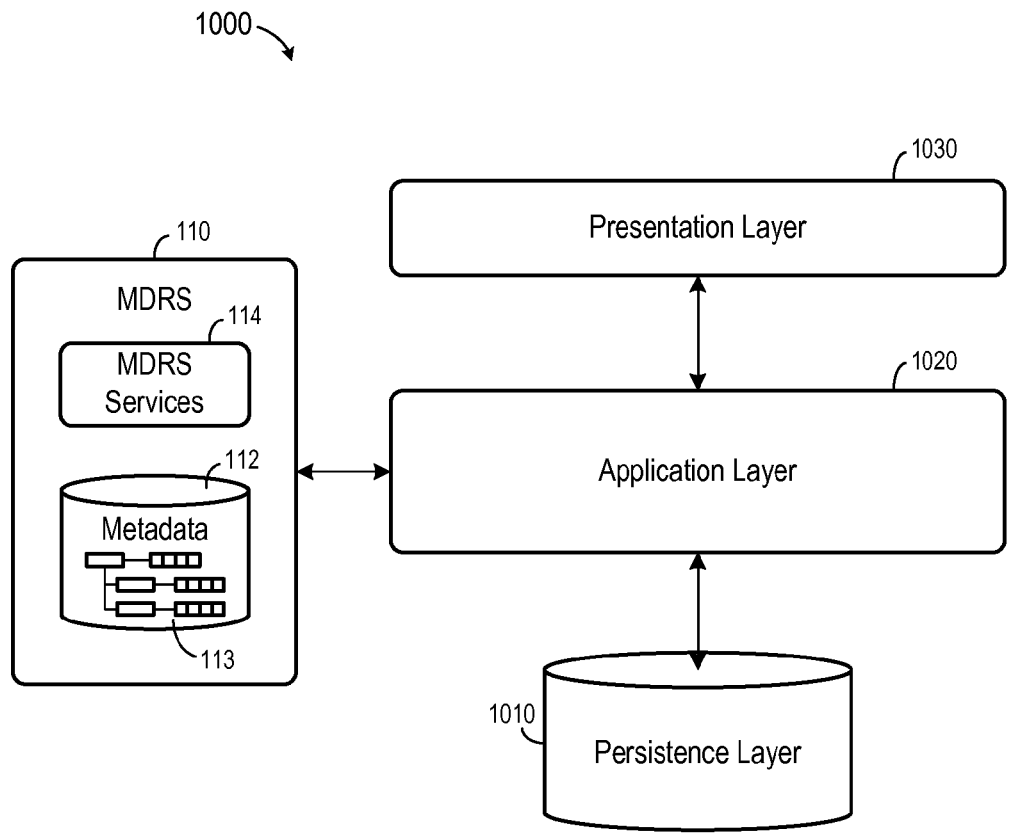
FIG. 10 is a block diagram of a system according to some embodiments.

In some embodiments, S940 through S960 may be performed at runtime. FIG. 10 is a block diagram of runtime system 1000 according to some embodiments. System 1000 includes persistence layer 1010 which may comprise a relational database system as is known in the art. However, embodiments are not limited thereto. Persistence layer 1010 may store object model instance data (e.g., SalesOrder 2711) for customer consumption. Persistence layer 1010 may store tenant-specific data which may conform to different tenant-specific object model extensions.

Application layer 1020 provides access to data stored in persistence layer 1010. Application layer 1020 accesses the data based on metadata models 113 of MDRS 110. Application layer 1020 may also include business logic for providing business functions based at least in part on the data of persistence layer 1010.

Presentation layer 1030 provides user interfaces for accessing data of persistence layer 1010 and/or functions provided by business logic via application layer 1020. Any suitable client devices (not shown) may host the user interfaces of presentation layer 1030 (i.e., in a rich client architecture) or may access the user interfaces remotely, such as through a Web-based portal.

Returning to process 900, a request for data associated with an instance of the object model is received at S940. The request may be received by application layer 1020 from presentation layer 1030 in response to an instruction passed thereto by a client device. For example, a client device may request data associated with SalesOrder 2711.

The data is retrieved at S950. However, the data is retrieved based on the extended object model and not based on the original object model. In this regard, metadata of the extended object model stored in MDRS 110 is used to access the appropriate data stored in persistence layer 110. The data is then returned to the requestor at S960.

S910 through S950 may occur at runtime in order to maintain separation of the object model and the extension object model among metadata models 113. In this regard, S930 may include identifying all of the extension object models of metadata models 113 which are active for the particular object model and for the tenant associated with the received request, and merging all of the identified extension object models with the object model to create the extended object model.

Figure 11:
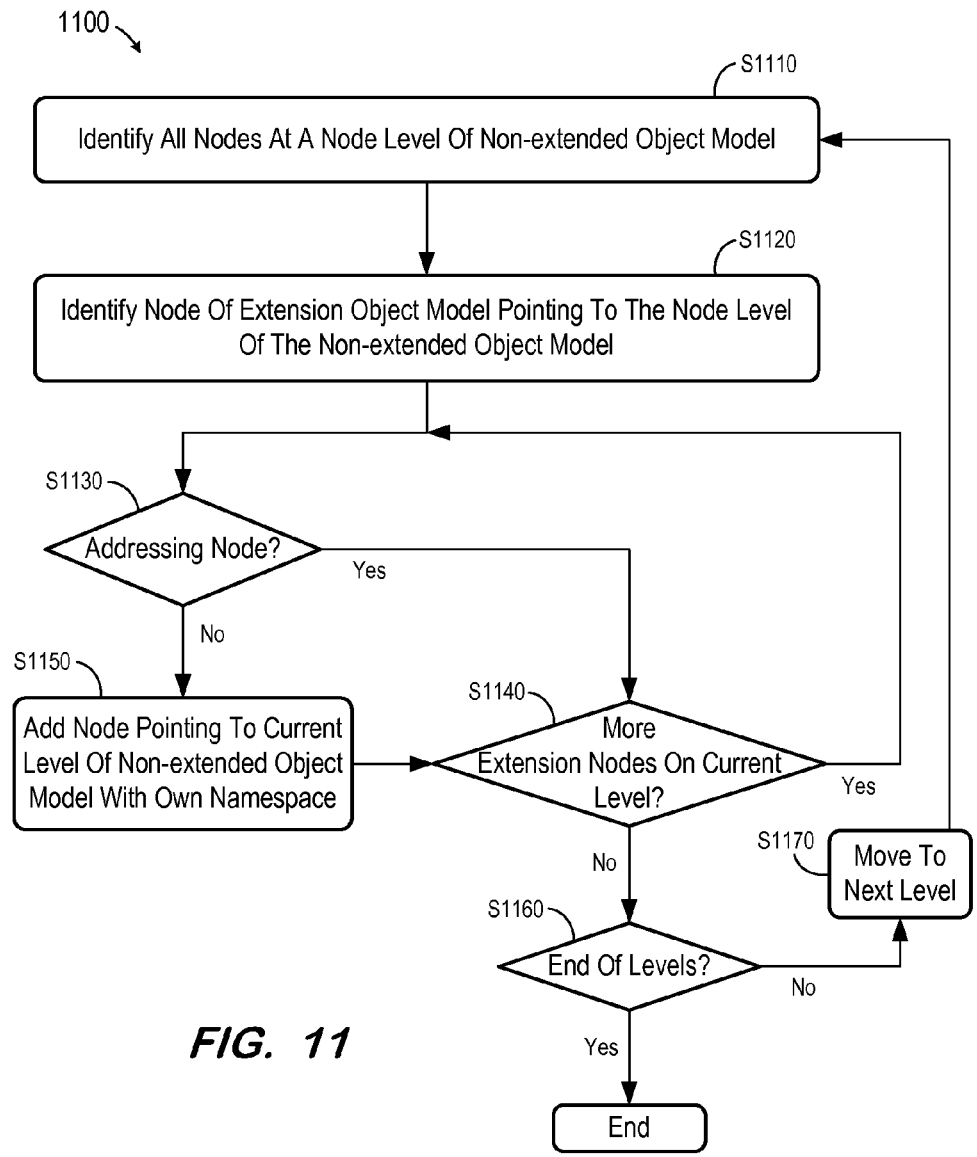
FIG. 11 is a flow diagram of a process according to some embodiments.

FIG. 11 is a flow diagram of an implementation of S930 according to some embodiments. Process 1100 begins at S1110 to identify all nodes of a non-extended object model. These nodes may be specified by metadata of the object model stored in metadata models 113.

FIG. 12 is a simplified block diagram of non-extended SO object model 1200 for purposes of explaining process 1100. FIG. 14A illustrates tabular representations 1410 and 1420 of the metadata of the nodes of object model 1200. The metadata of representations 1410 and 1420 may be stored in MDRS 110 according to some embodiments.

At S1120, a node of an extension object model pointing to a node level of the non-extended object model is identified. It will be assumed that the first node level to be considered is the root of object model 1200. Extension object model 1300 of FIG. 13 is associated with object model 1200 and will be discussed in the present example.

The node 'A: addressing' is identified at S1120 because it points to the root node level of object model 1200. Next, at S1130, it is determined whether the identified node is an addressing node. Since the determination is positive, flow proceeds to S1140 to determine whether more extension nodes exist on the current level. In the present example, extension node 'A: /ISV/1' of extension object model 1300 exists on the current level so flow returns to S1130 to determine if this node is an addressing node.

Flow continues to S1150 because the currently-identified node is not an addressing node. At S1150, a node is added to the metadata of the non-extended object which points to the current level of the non-extended object. The added node is associated with its own namespace. As mentioned above, the dedicated namespace reduces conflicts due to multiple active extensions, etc.

FIG. 14B illustrates the addition of the metadata at S1150. In particular, tabular representation 1410, which includes metadata of the current node level, now includes metadata identifying the new node (/ISV/1) and its namespace (/ISV/EXT).

No more nodes exist on the current level so flow continues from S1140 to S1160. At S1160, it is determined whether another node level exists. In the present example, node level A is below the root node, so the inquiry moves to the next level at S1170 and flow returns to S1120.

Continuing with the present example, node 'B: /ISV/A' of the extension object is identified at S1120. Since this node is not an addressing node, a corresponding node is added at S1150 to the metadata of the non-extended object which points to the current level of the non-extended object. Tabular representation 1420 of FIG. 14B illustrates the addition of metadata identifying the new node (/ISV/1) and its namespace (/ISV/EXT) to the current node level.

Figure 15:
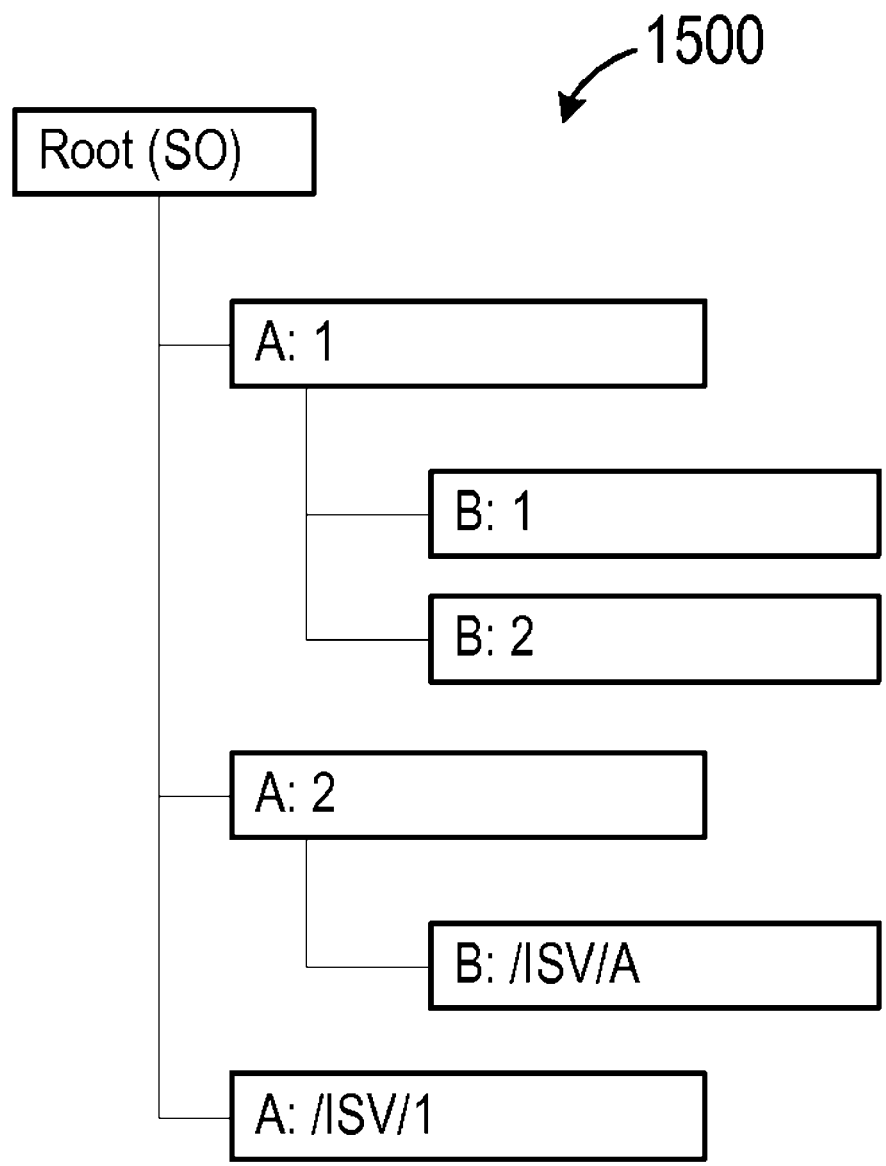
FIG. 15 is a diagram of an extended instance of a business object metaobject according to some embodiments.

FIG. 15 is a representation of extended object model 1500 based on the merged metadata of FIG. 14B. During runtime according to some embodiments, extended object model 1500 is consumed instead of object model 1200. A consumer is not aware of which elements of extended object model 1500 are present due to extension object model 1300.

Figure 16:
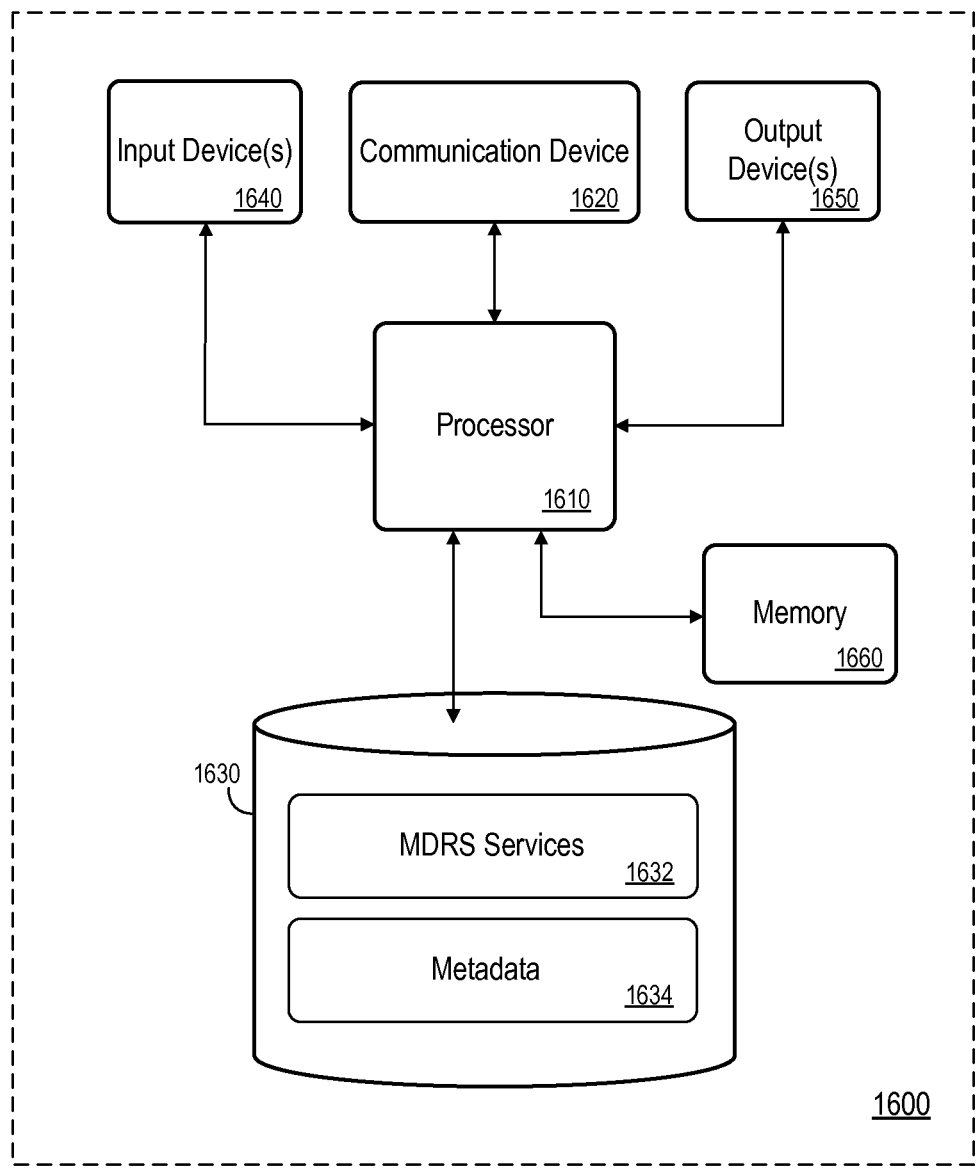
FIG. 16 is a functional block diagram of an apparatus according to some embodiments.

FIG. 16 is a block diagram of apparatus 1600 according to some embodiments. Apparatus 1600 may comprise a general-purpose computing apparatus and may execute program code to perform any of the functions described herein. Apparatus 1600 may comprise an implementation of MDRS 110. Apparatus 1600 may include other unshown elements according to some embodiments.

Apparatus 1600 includes processor 1610 operatively coupled to communication device 1620, data storage device 1630, one or more input devices 1640, one or more output devices 1650 and memory 1660. Communication device 1620 may facilitate communication with external devices, such as an external design tool. Input device(s) 1640 may comprise, for example, a keyboard, a keypad, a mouse or other pointing device, a microphone, knob or a switch, an infra-red (IR) port, a docking station, and/or a touch screen. Input device(s) 1640 may be used, for example, to enter information into apparatus 1600. Output device(s) 1650 may comprise, for example, a display (e.g., a display screen) a speaker, and/or a printer.

Data storage device 1630 may comprise any appropriate persistent storage device, including combinations of magnetic storage devices (e.g., magnetic tape, hard disk drives and flash memory), optical storage devices, Read Only Memory (ROM) devices, etc., while memory 1660 may comprise Random Access Memory (RAM).

MDRS services 1632 of data storage device 1630 includes program code for execution by processor 1610 to provide functions described herein, including but not limited to processes 900 and/or 1100. Embodiments are not limited to execution of these functions by a single apparatus. Metadata 1634 may include metadata defining metadata models (e.g., Business Object) and instances thereof (e.g., SalesOrder, SalesOrder Extension) as described herein. Data storage device 1430 may also store data and other program code for providing additional functionality and/or which are necessary for operation thereof, such as device drivers, operating system files, etc.

The following is a discussion of technical considerations according to some embodiments.

The root node of a non-extended object model does not provide any "place" for merging metadata from the root node of a corresponding extension object model. Also, since extensions are to be additive as described above, an extension object model cannot redefine properties of its corresponding non-extended object model. Thus, the root node of an extension object model may only store administrative information. Furthermore, the fields that express business semantics or that define technical properties for the parent metaobject may be disabled for the extension object model.

The stored administrative information should specify a relationship to the non-extended object model. The relationship may be specified by an association to the non-extended object model and a corresponding foreign key field. These may be modeled with the following naming convention: Foreign key field: Extended MOTypeKeyAssociation: ExtendedMOType.

The root node of the extension object model may also include information related to its transportability, such as the name of the extension object model (as specified in a directory of MDRS 110), a namespace to be used for all new sub-entities of the extension object model, a class for an extension service provider, and a LifeCycle status of the extension object model (e.g., if it has been activated or not).

The information of an addressing node of an extension object model also cannot be merged back into a corresponding node of the corresponding non-extended object model. Thus, an addressing node may store only technical information for the extension object model.

Since addressing nodes indicate which "core" nodes are being extended by their child nodes, every node that can be an addressing node (i.e., all nodes above those nodes that can be added by extenders) includes the following foreign key field and association: Foreign key field: ExtendedMONodeTypeKey; Association: ExtendedMONodeType. MONode refers to the node type of the addressing node itself.

Unlike the extension root key, the key of an addressing node may not be visible in the merged (i.e., extended) object model. If multiple addressing nodes are not permitted in the same extension object model that point to the same extended node instance, the node key of the addressing node can be calculated by taking the key of the extended node and swapping the key of the extended MO by the key of the extension MO. In this regard, a node key is typically modeled in MDRS 110 as: Parent Node Key; Proxy name.

In most cases all other fields of an addressing node are disabled. Nevertheless, cases may exist in which additional information relevant for the extension object model is needed. This information could include generic administrative fields such as SystemAdministrativeData or status fields. In some cases, this information may include a reference to the extension data type for addressing nodes of a metaobject node.

The existence of addressing nodes can change cardinalities of the corresponding metaobject. In an instance of a Business Object metaobject, every node includes at least one field which can also be expressed in the metaobject. An extension object model, however, can include an addressing node with new action nodes as children but no new field nodes. Thus, the technical cardinality for the field node is not 1 . . . n but is instead 0 . . . n. Of course, in the context of the Business Object metaobject and the merged (i.e., extended) object model, the cardinality is still 1 . . . n.

Generally, a node instance that is added via an extension exhibits the same features as a node of the extended object model. In particular, all fields that have business semantics will be enabled and behave in the same way as in the extended object model.

However, extended nodes should not clash with original nodes (e.g., those added later via a support package after the extension was created), nor with nodes added by other extensions. This independence must be ensured for all alternative keys that can be defined for the node. The treatment for each alternative key will be different but most of them will require some kind of namespace. Thus, depending on the types of defined alternative keys, an additional namespace field may be required.

During a metadata merge, a node added by the extension object model will be copied over to the original object model into a transient node. The key of the transient node will be similar to the key of the extension node in the extension object model. The metaobject (MO) key in the node key is then changed from the extension object model to the extended object model.

The merge may also require some additional fields in order to point to the extension from which the information came. These fields may be modeled as follows: Foreign key field: ExtendingMONodeTypeKey; Association: ExtendingMONodeType.

A designer adding a node via an extension object model may also add all possible sub-nodes of this node. These sub-nodes are treated differently to the parent node. For instance, while the parent needs a namespace to ensure the uniqueness of its name, a namespace is not needed for the sub-nodes. There is also no need for a foreign key field that shows from which extension the sub-node was added, since this information can be taken from the parent node. Thus, these sub-nodes (and their sub-nodes, if any) do not have to be prepared for extensibility in the parent metaobject.

Now considered is a common feature in metaobject models that is not purely additive: the OrdinalNumberValue. In a User Interface metaobject, all entities on a same level appear in some order. The OrdinalNumberValue allows modeling of this order. This is convenient for the core object model and even within an extension object model but is not easily handled within a merge of a core object model with one or even multiple extension object models.

Specifically, the OrdinalNumberValues of all the extension (s) will potentially clash unless the different extenders are assigned to distinct number ranges. An administration of number ranges is somewhat inefficient for a simple value that has no effect on the runtime. Some embodiments therefore recalculate the ordinal number values in the merge by preserving the core numbers and tagging on the extension numbers. Within one extension, the extension numbers should then preserve the order defined within the extension. Between different extensions, the numbers could be consecutive according to the layering. Numbers of parallel extensions could be in a random or other desired order (e.g., alphabetical).

In some embodiments, a metadata merge as described herein occurs in the extension object model as well in the original object model. This may reduce the need for addressing nodes unless they are needed for storing extension-specific information. Furthermore, a designer would not have to create addressing nodes, but would instead select a parent node to be extended and add the extension there.

Advantages to providing an extension with persisted, modeled extension nodes include the ability to model additional information at the addressing node. Also, if the core node that serves as the anchor for extensions is remodeled, the extension breaks. With an addressing node, the addressing node becomes inconsistent and has to be changed by the designer. If, however, no addressing node exists, the whole metaobject instance becomes technically inconsistent so that it cannot be retrieved and modified; thus the designer cannot remedy the situation.

However, if addressing nodes are not used, every technical consumer that wants to create an extension has to execute three steps: first, the root node of the extension is created; then, the other, merged, nodes are retrieved; and finally, sub-nodes of the merged nodes are created. With addressing nodes, an entire extension object instance can be created in one single modification step. Accordingly, some embodiments include explicitly modeled, persisted, addressing nodes and do not perform any merge in extension instances.

Metadata models 113 reflect networks of references between entities. Some of the references are defined implicitly via the tree structure of corresponding metaobjects, but most others are modeled explicitly using foreign keys and associations.

Since extension data is also replicated within the original, one could refer explicitly to the extension that defines the data or one could refer to the extension implicitly via the replication. The former may not be desirable because an extension of an extension would have to specify the original it extends and also the extension which it extends. Thus, the ExtendedMOKey could not be modeled at the root node (i.e., because its cardinality would be n instead of 1) but rather at an explicit sub-node created for this purpose. Also, an extension adding an association between two nodes added by other extensions would have to point to three different objects: the original and the two extensions.

Also, the former approach creates technical anchor points that can easily break. For example, the name of an extension is not relevant for the runtime and can therefore be changed without changing the behavior. Likewise, two extensions of the same original by the same extender can be merged into one or split into three without affecting the runtime. By referring explicitly to extensions, an extender renders the extensions to anchor points that will break if any of the above changes occur. Thus, the extender binds to information that is not meant to be public.

Each system and device described herein may be implemented by any number of devices in communication via any number of other public and/or private networks. Two or more devices may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by a computer in response to execution of program code by a processor of said computer, comprising:
    acquiring metadata defining a first object model including extensible entities, the first object model comprising an instance of a metaobject;
    acquiring metadata defining an extension object model, the extension object model to extend at least one of the extensible entities of the first object model;
    merging the first object model and the extension object model to create metadata defining an extended object model, the extended object model comprising an instance of the metaobject, the merging including identifying a node of the extension object model pointing to a node of the first object, adding the node to the first object model when the node of the extension object model is not an addressing node, and not adding the node to the first object model when the node of the extension object model is an addressing node;
    receiving a request for data associated with an instance of the first object model; and
    retrieving data associated with the instance of the first object model based on the metadata defining the extension object model, wherein the extension object model comprises an instance of the metaobject.

2. The method according to claim 1, wherein a namespace of the added node is different from a namespace of the node of the first object model.

3. A non-transitory computer-readable medium having program code stored thereon, the program code comprising:
    code to acquire metadata defining a first object model including extensible entities, the first object model comprising an instance of a metaobject;
    code to acquire metadata defining an extension object model, the extension object model to extend at least one of the extensible entities of the first object;
    code to merge the first object model and the extension object to create metadata defining an extended object model, the extended object model comprising an instance of the metaobject, the merge code including code to identify a node of the extension object model pointing to a node of the first object, code to add the node to the first object model when the node of the extension object model is not an addressing node, and not add the node to the first object model when the node of the extension object model is an addressing node;
    code to receive a request for data associated with an instance of the first object model; and
    code to retrieve data associated with the instance of the first object model based on the metadata defining the extension object model, wherein the extension object model comprises an instance of the metaobject.

4. The non-transitory computer-readable medium according to claim 3, wherein a namespace of the added node is different from a namespace of the node of the first object model.

5. A computer-implemented metadata repository comprising:
    at least one storage device storing:
        first metadata defining a first object model including extensible entities, the first object model comprising an instance of a metaobject;
        second metadata defining an extension object model, the extension object model to extend at least one of the extensible entities of the first object model; and
        executable program code of a service to merge the first object model and the extension object model to create metadata defining an extended object model, the extended object model comprising an instance of the metaobject, the merge including identification of a node of the extension object model pointing to a node of the first object, addition of the node to the first object model when the node of the extension object model is not an addressing node, and not add the node to the first object model when the node of the extension object model is an addressing node;
    the executable program code of the service further to receive a request for data associated with an instance of the first object model, and to retrieve data associated with the instance of the first object model based on the metadata defining the extension object model, wherein the extension object model comprises an instance of the metaobject; and
    a processor to execute the executable program code.

6. The computer-implemented metadata repository according to claim 5, wherein a namespace of the added node is different from a namespace of the node of the first object model.

* * * * *